Figure 1:
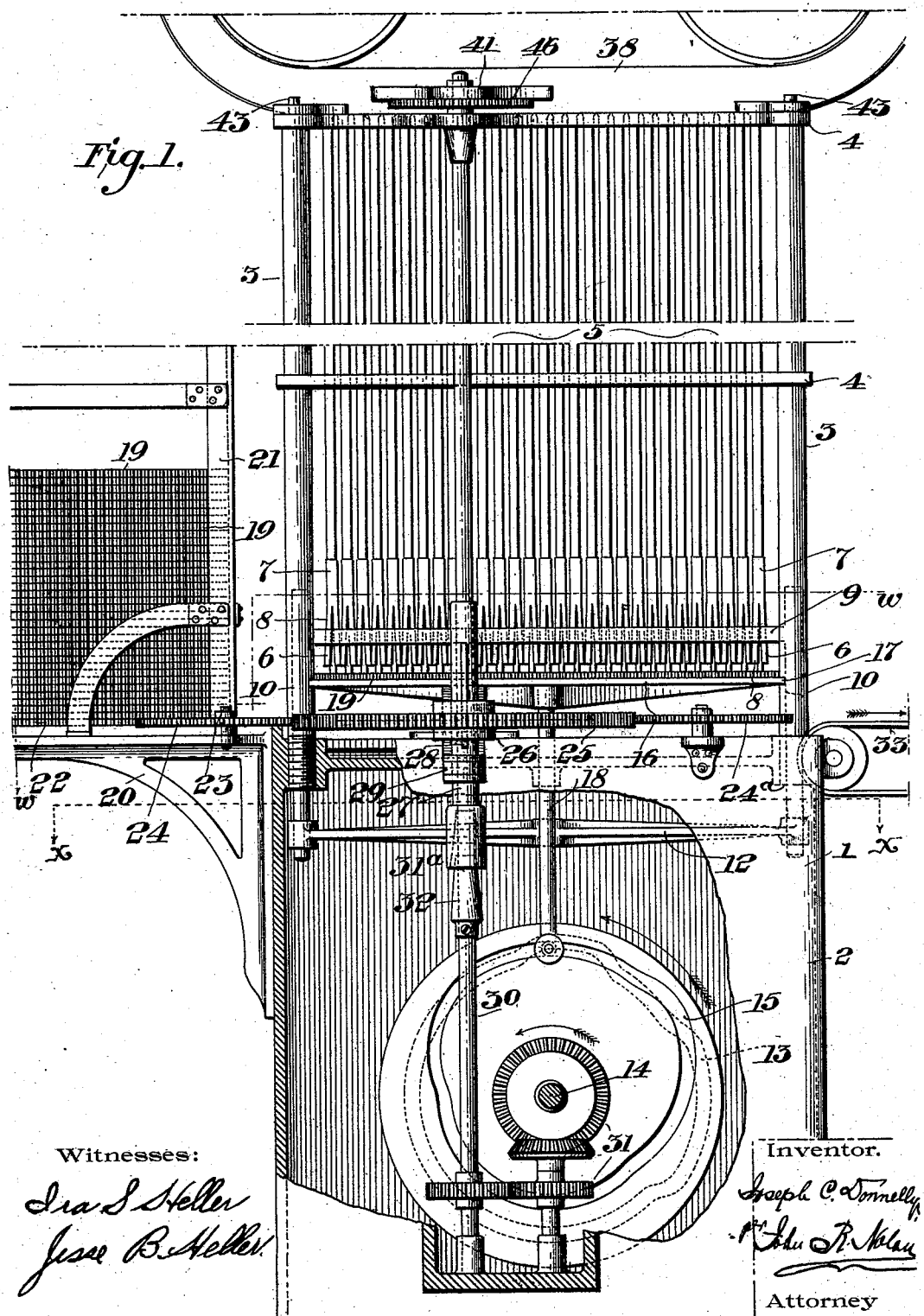

(No Model.) 5 Sheets—Sheet 1.
J. C. DONNELLY.
MATCH SPLINT ASSEMBLING MACHINE.

No. 524,196. Patented Aug. 7, 1894.

Witnesses:
Ira S. Heller
Jesse B. Heller

Inventor.
Joseph C. Donnelly
John R. Nolan
Attorney (No Model.) 5 Sheets—Sheet 2.

J. C. DONNELLY.
MATCH SPLINT ASSEMBLING MACHINE.

No. 524,196. Patented Aug. 7, 1894.

Witnesses: Ira S. Heller, Jesse B. Heller

Inventor: Joseph C. Donnelly, per John F. Nolan, Attorney.

(No Model.) 5 Sheets—Sheet 3.

J. C. DONNELLY.
MATCH SPLINT ASSEMBLING MACHINE.

No. 524,196. Patented Aug. 7, 1894.

Witnesses:
Ira S. Heller
Jesse B. Heller

Inventor.
Joseph C. Donnelly
per John R. Nolan
Attorney.

(No Model.)  5 Sheets—Sheet 4.

J. C. DONNELLY.
MATCH SPLINT ASSEMBLING MACHINE.

No. 524,196.  Patented Aug. 7, 1894.

Witnesses:
Ira S. Heller
Jesse B. Heller

Inventor.
Joseph C. Donnelly,
per John F. Nolan
Attorney.

(No Model.) 5 Sheets—Sheet 5.
J. C. DONNELLY.
MATCH SPLINT ASSEMBLING MACHINE.
No. 524,196. Patented Aug. 7, 1894.
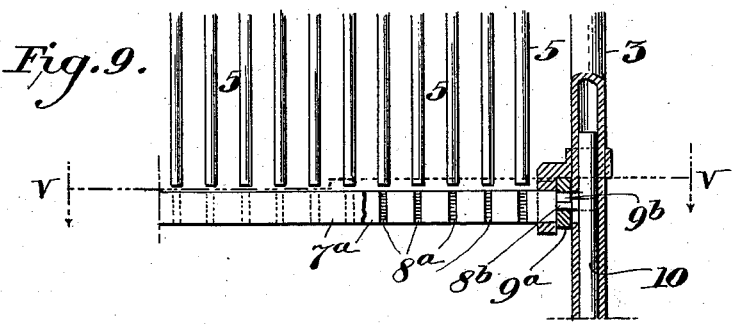
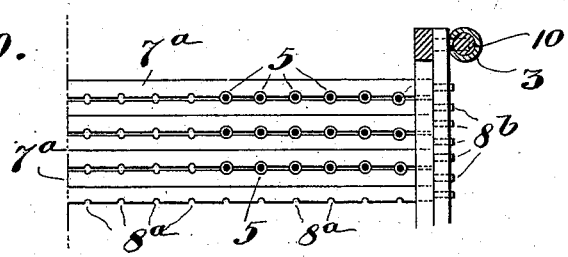
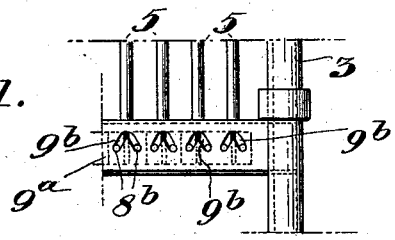
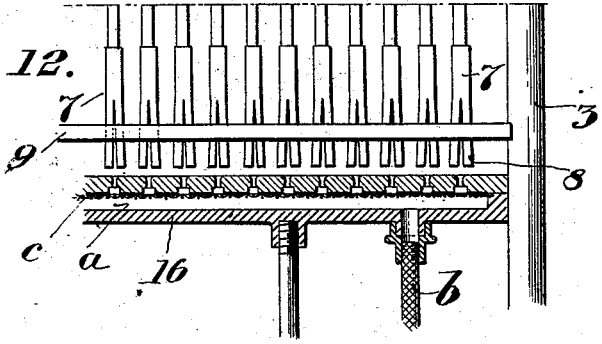
Witnesses:
Ira S. Heller
Jesse B. Heller
Inventor:
Joseph C. Donnelly
per John R. Nolan
Attorney.

UNITED STATES PATENT OFFICE.

JOSEPH C. DONNELLY, OF PHILADELPHIA, PENNSYLVANIA.

MATCH-SPLINT-ASSEMBLING MACHINE.

SPECIFICATION forming part of Letters Patent No. 524,196, dated August 7, 1894.

Application filed January 10, 1894. Serial No. 496,345. (No model.)

*To all whom it may concern:*

Be it known that I, JOSEPH C. DONNELLY, a citizen of the United States, residing in the city and county of Philadelphia and State of Pennsylvania, have invented certain new and useful Improvements in Match-Splint-Assembling Machines, of which the following is a full, clear, and exact description, reference being had to the accompanying drawings, forming a part of this specification.

This invention relates to match making machines, and more especially to mechanism for assembling the splints in perforated supporting plates preparatory to the dipping operation; my object, as generally stated, being to provide a construction in which the previously-cut splints shall be fed automatically to said plates in accurate register with the perforations therein; then be clamped in such position and be entered in the perforations; and to provide means whereby the plate, with its complement of splints, shall be withdrawn from the feeding devices and be succeeded by another perforated plate which shall be, in turn, supplied with splints; then be removed from the machine, and be followed by another plate, and so on successively.

With this object in view my invention embraces, *inter alia*, a construction of hopper, and mechanism for operating the same; a construction and arrangement of tubular feeding devices or magazines; a construction and arrangement of splint clamping and releasing mechanism; mechanism for supporting and operating the perforated plates in reference to the clamping and releasing mechanism; and means for feeding the plates to, and removing them from, said supporting mechanism; together with various other novel features of construction, and organization of parts whereby the mechanisms are actuated relatively to each other, at the different stages, of the operation, all as will be hereinafter fully set forth in detail and be definitely claimed.

Figure 2:
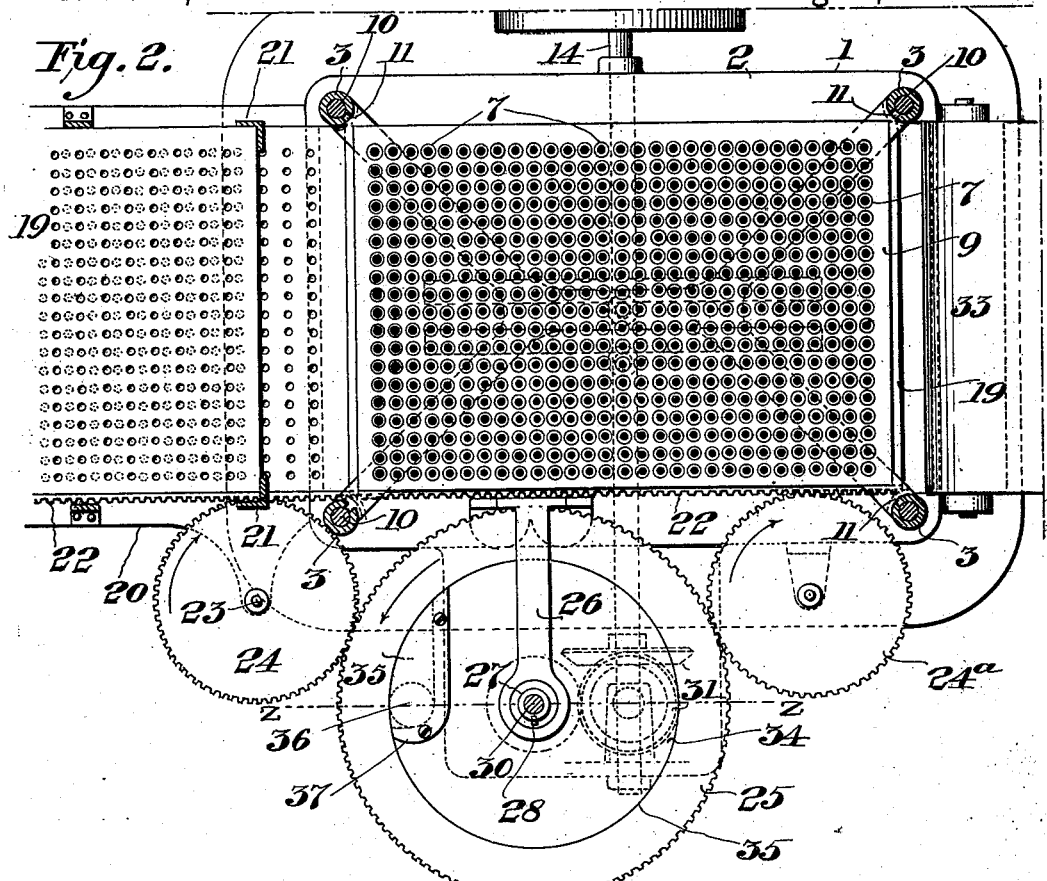
Figure 4:
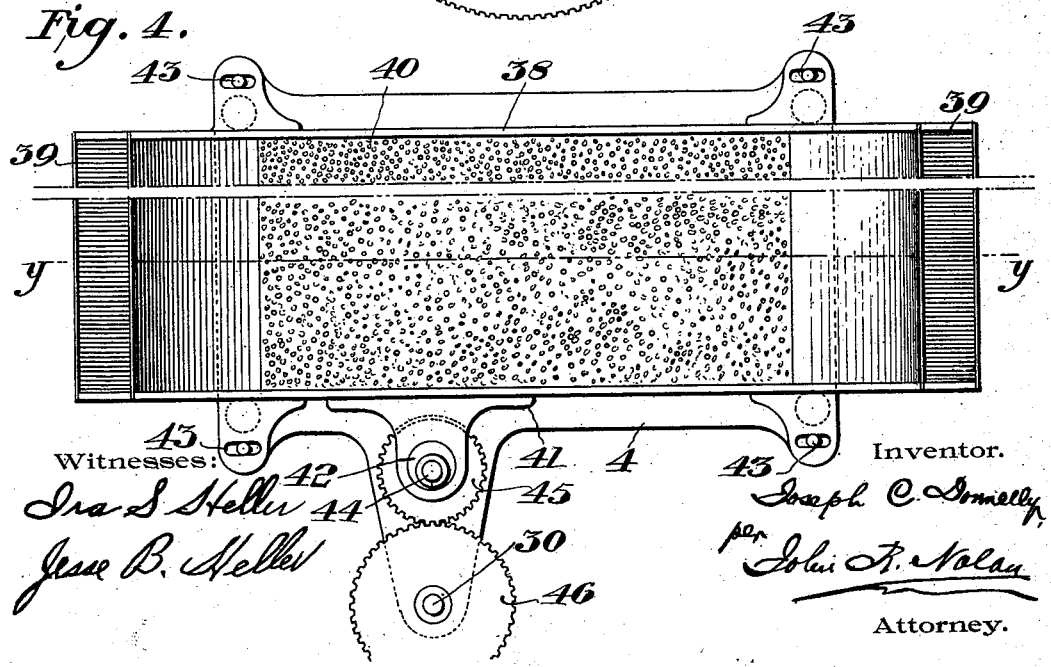
Figure 3:
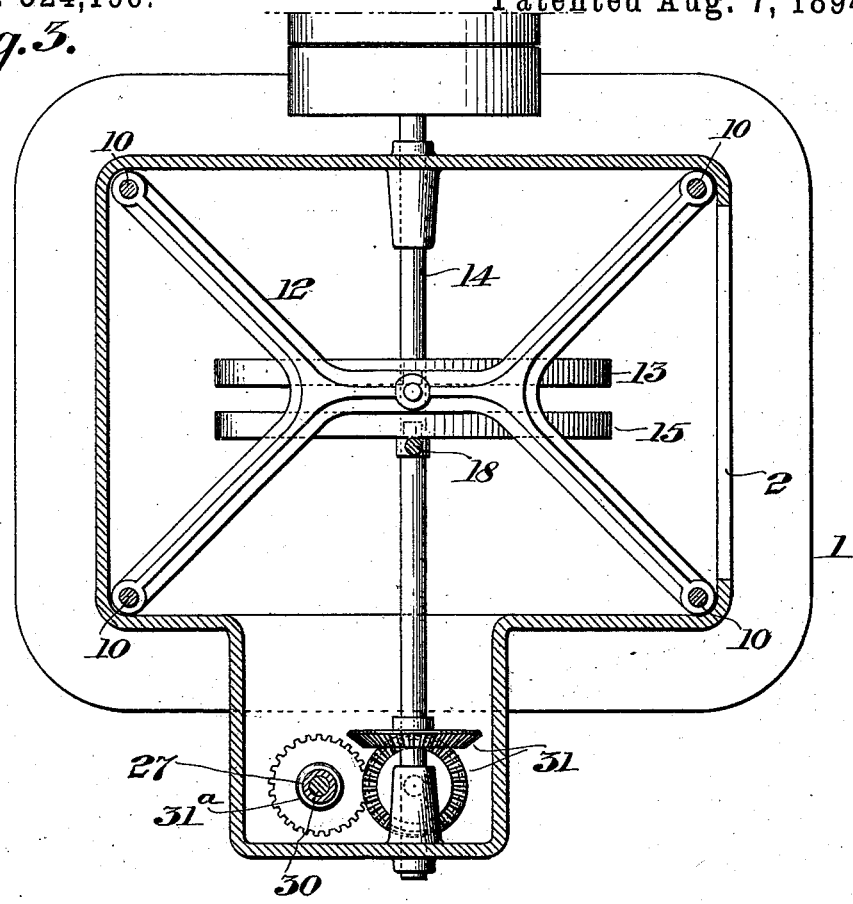
Figure 8:
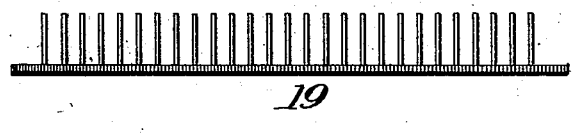
Figure 5:
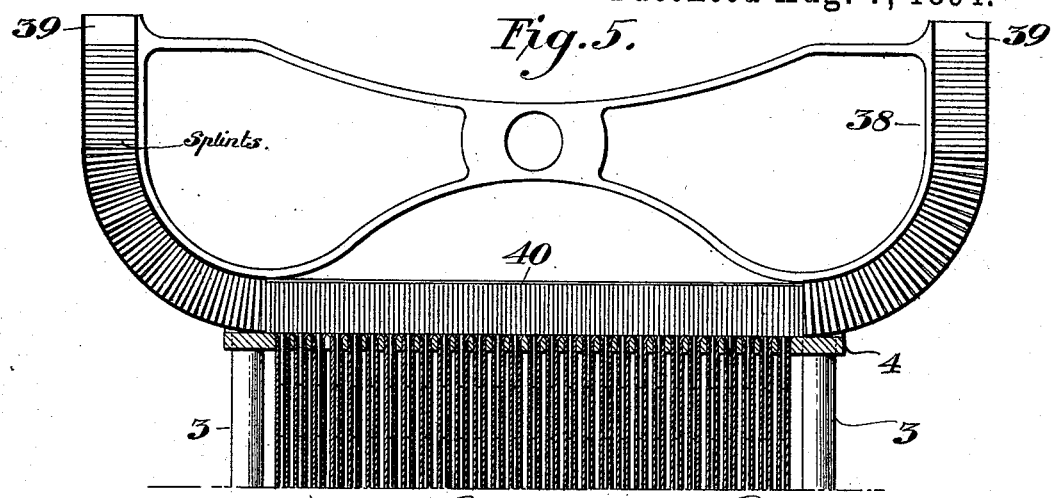
Figure 6:
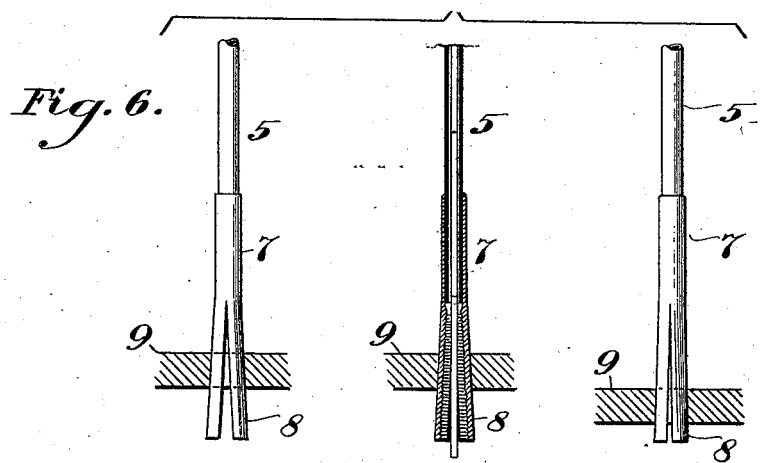
Figure 7:
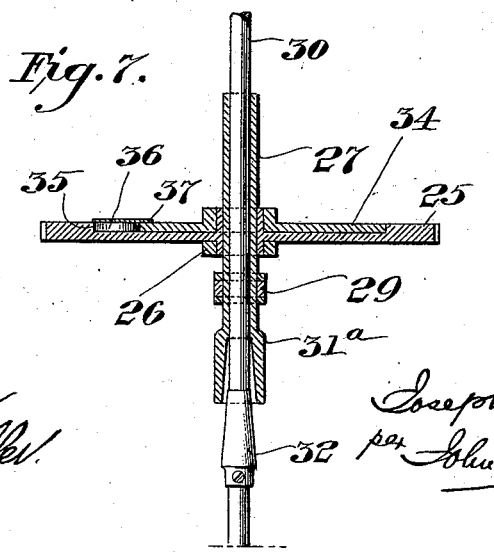

In the drawings, Figure 1 is a sectional elevation of a machine embodying my invention. Fig. 2 is a section on the line $w$—$w$ of Fig. 1. Fig. 3 is a section on the line $x$—$x$ of Fig. 1. Fig. 4 is a plan of the hopper with immediate connections. Fig. 5 is a section on the line $y$—$y$ of Fig. 4. Fig. 6 represents the splint clamping and releasing devices on the lower ends of the magazines. Fig. 7 is a partial section on the line $z$—$z$ of Fig. 2. Fig. 8 is an elevation of one of the splint holding plates with its complement of splints. Fig. 9 is a detail, in sectional elevation, of a modification of the clamping and releasing devices. Fig. 10 is a section on the line $v$—$v$ of Fig. 9. Fig. 11 is an end view of Fig. 10; and Fig. 12 is a detail, in sectional elevation, showing a modified construction of splint holding plate and supporting bed therefor.

The numeral 1 represents the frame-work of the machine, comprising a vertical casing 2; posts or standards 3 rising from the corners thereof, and horizontally-disposed perforated plates 4 firmly supported by said posts or standards. The plates are similarly perforated and are so arranged that the apertures therein are in alignment.

Fitted to the apertures are vertical tubes 5, the diameter of each of which is sufficient to permit the free passage through it of a match splint lengthwise. The tubes are preferably of considerable length, so that a large number of splints, end to end, may be contained in each tube. Said tubes therefore, constitute magazines. The ends of the tubes which enter the perforations in the upper plate 4 are flush with the top of the latter, and are desirably beveled or flared slightly so as to facilitate the entrance of the splints thereto, as hereinafter described. The lower ends of the magazines are provided with clamping and releasing devices 6 which may be of any suitable construction. In the present instance, each of these devices comprises a short tube 7 of spring metal, partially split longitudinally at its lower end to form normally open clamping jaws 8, the undivided part being secured to the end of the main tube or magazine to constitute, in effect, a continuation thereof. The jaws are so constructed that when they are forced together, or closed, they will firmly clamp an interposed splint. These jaws are preferably milled or roughened on their inner or working faces so as to clamp the splints still more effectually.

One way by which these jaws may be operated, is illustrated most clearly in Figs. 1 and 6 of the drawings, that is to say, 9 is a horizontally-disposed perforated plate, through the apertures of which extend the clamping devices 6, which apertures are of such size, that when the plate is depressed, the jaws of the respective clamping devices will be forcibly closed, and that when said plate is raised said jaws, being released, will automatically resume their normal or open position. Hence, by the act of reciprocating the plate the jaws will be alternately closed and opened. The four corners of this plate 9 are connected with vertically-movable rods 10 that are fitted to the posts, the latter being hollow to receive the rods and being laterally slotted as at 11 to permit the connection of the rods with the plate. The lower ends of these rods depend into the casing and are connected with a horizontal cross-head 12, which is, in turn, connected with, and operated by, a cam 13 on the main driving shaft 14. Cam 13 is preferably a face-cam, of proper contour, to impart the requisite vertical movements to the plate. On the shaft 14 adjacent to the cam is fixed another cam 15 which is adapted to control the movements of a horizontal bed 16 mounted beneath the series of tubular magazines. The corners of this plate are provided with guides 17 which are fitted to the posts 3.

Depending from the bed 16 is a rod 18 which is connected with the cam 15, the groove of which is of proper form relative to that of the adjacent cam to insure harmonious action of the parts. The bed is adapted to support, successively, the perforated plates 19 in which the match splints are to be assembled preparatory to the dipping operation, suitable provisions, such as those hereinafter described, being afforded for the transmission of the plates to and from the support. Normally the support occupies the raised position indicated in Fig. 1, a plate 19 being sustained thereon, which plate, as will be observed, is a slight distance below the ends of the clamping and releasing jaws. At this stage the plate is in the raised position, and, perforce, the jaws are open. Hence the extremities of the lowermost splints contained in the tubes project below said jaws and rest upon the plate. The perforations in this plate are in alignment with the series of magazines above, so that the splints which are slightly larger than the apertures, rest upon the upper edges of the latter.

Upon the machine being set in operation, the plate 9 is depressed to close the jaws and thereby clamp the splints, following which, the bed with its supported plate 19, is forcibly raised. Thus the perforations of said plate are forced upon the projecting ends of the registering splints. This done, the plate 9 is raised to release the lowermost or clamped splints, whereupon the bed is dropped to the level of the casing, or nearly so, for the purpose of lowering the plate 19 with the series of splints therein. Plate 9 is then depressed to clamp the projecting ends of the next succeeding series of splints in the magazines, the plate 19 with its complement of splints, is removed from the machine, another similarly perforated plate is deposited upon the bed, the latter is raised to the intermediate position first above mentioned, and finally, the plate 9 is again raised to free the lower ends of the splints from the clamping jaws, and permit them to settle uniformly upon the bed. This done, the parts are in position for a repetition of the operation hereinbefore described.

Although the splint receiving plates 19 may be fed to the machine, and upon being charged, be removed therefrom, manually, I have provided automatic mechanism to effect these operations, which mechanism, in a form that I consider to be very efficient and desirable, is shown in the drawings, as follows: Bolted to one side of the frame work is a bracket 20, the upper face of which is on the same plane as that of the reciprocative bed when the latter is in its lowermost position. Upon this bracket is supported a series of the plates 19, the same being piled one upon another as shown in Fig. 1. A suitable frame 21 supported upon the bracket, maintains the plates in position. One edge of each plate is milled or toothed, as at 22, the several plates being so disposed that the milled or toothed portions are on the same side of the machine.

Mounted in a stud 23 rising from a lateral extension of the bracket 20 is a wheel 24 which is milled or toothed correspondingly with the plates 19. This wheel occupies the same horizontal plane as the lowermost plate of the pile, and is so disposed that its teeth mesh with those of said plate. Gearing with this wheel is a larger wheel 25 the hub of which is mounted in a slotted or bifurcated arm 26 projecting from the casing. Extending centrally through this wheel is a sleeve 27 which is connected with the former by means of a spline 28 whereby the vertical movement of the sleeve may be had without disconnecting it from the wheel. This sleeve is revolubly supported by an outwardly extending arm 29 connected with the bed 16 whereby the sleeve will be reciprocated by and with said bed. Through the sleeve extends a vertical shaft 30 which is connected with, and operated from, the main shaft, by means of the interposed gearing 31.

On the lower end of the sleeve, and, adjacent thereto, on the shaft 30, are two co-acting clutch members 31ª, 32, respectively, which are so disposed relatively to each other that when the sleeve is in the down position, they are engaged, and the converse. Hence, when the bed is lowered, the motion is transmitted from the shaft 30 to the wheel 25, thence to the wheel 24. Thereupon the latter, turning in the direction indicated by the arrow, transfers the engaged plate 19 to said bed. Gearing with the wheel 25 is a smaller wheel 24ª corresponding with wheel 24. This wheel 24ª extends into the path traversed by the edge of the perforated plate 19 as it is transferred to the bed, and is so arranged that its teeth engage those of said plate as the latter is freed from the wheel 24, and thereby conduct said plate into proper position in reference to the overhanging magazines. This being done, the bed, with the plate thereon, is elevated as above described, the upward movement of the bed disengaging the clutch member of the sleeve from that on the shaft 30 and as a result, rendering the wheels quiescent.

When the lowermost plate 19 is disengaged from the wheel 24, the next succeeding plate in the pile drops down upon the bracket, the toothed edge of that plate thereupon engaging the teeth of said wheel. The wheels are so arranged that while the wheel 24ª is adjusting the first-named plate, the wheel 24 advances the following plate toward, but not upon, the bed. When the plate upon said bed has been supplied with the match splints from the magazines above, said plate is lowered as above described; the clutch members are engaged as before stated, and the wheels are actuated. The charged plate 19 in its descent engages the wheel 24ª and said wheel, as it rotates, projects the plate from the machine. At the same time, the other wheel 24 transfers to the bed the engaged perforated plate of the pile and the operation just described is repeated. When the plate with its complement of splints is transmitted from the bed, the former preferably passes upon an endless conveyer 33 by and upon which it is carried to any suitable point of discharge. If desired, however, this off-bearing belt may be omitted, in which case the plates as they are moved outward, may be removed by an attendant.

In order to prevent any liability of backward movement of the wheels, I provide one or all of them with a suitable back stop. Although the well-known ratchet and pawl devices may be used for this purpose, I have devised another means therefor, which is more desirable, in that there is absent the clicking noise incident to the former device. In the present instance I have shown the large wheel 25 as equipped with the back stop, as follows: Secured to, or formed on, the arm 26 concentric with the wheel, is a circular disk 34 which fits within a corresponding recess in the face of the wheel. In the edge of this disk is formed a recess 35 in which a smaller disk 36 is disposed so as to rest upon the web of the wheel. This disk is confined by means of a cap 37 fastened to the larger disk. It will be seen that, when the wheel is rotating in the direction of the arrow, the disk 36 will not interfere with the movement of the wheel, but the instant the wheel tends to turn backward the smaller disk will become wedged between the opposed edges of the larger disk and wheel respectively, and thereby prevent such backward movement.

The tubular magazines are surmounted by a feed hopper 38 to which the splints are introduced, which hopper, in its preferred form is U-shaped, as shown, that is to say it comprises two vertical chambers 39 curved inward at their lower ends to communicate with a horizontal chamber 40. This chamber 40 is open at top, while the upper plate 4 through which the magazines extend, constitutes a bottom therefor. By this construction it will be seen that if the splints be fed horizontally to the vertical chambers, and the hopper be agitated, said splints, in their descent, will radiate around the curved portions of the chambers and thus be caused to assume a vertical position as they pass to the horizontal chamber 40. Thereupon, said splints will enter and charge the magazines as above described, see Fig. 5.

As a simple and efficient means to effect the agitation of the hopper, I provide the front wall thereof with a suitable bracket 41 to which is fitted an eccentric 42 driven from a suitable source of power, there being provided appropriate guide devices, such as the pin and slot connections 43 between the body of the hopper and the proximate plate 4. In the present instance the eccentric is mounted on a stud 44 rising from an extension of said plate which stud is equipped with a pinion 45 that gears with a spur wheel 46 on the upper end of the vertical shaft 30. Hence during the operation of the machine, said shaft, through the intermediate gearing, actuates the eccentric, which, in turn, rapidly reciprocates the hopper. See Fig. 4.

I here remark that while the plates 19 may be constructed entirely of metal, the teeth being cut in the edge thereof, I prefer to make the plate of wood, owing to its lightness and cheapness, and to secure to its edge a piece of metal in which the teeth or serrations are formed. I also remark that instead of the normally-open clamping jaws being rigidly connected with the magazines, and being closed by a sliding plate, said jaws may have a sliding connection with the magazines and the plate be fixed, the upward movement of the jaws in the perforations of the plate effecting the closing of the jaws. It is unnecessary to specially illustrate this alternative construction, as in general appearance it does not differ from that of the first described arrangement.

In Figs. 9, 10 and 11 I have shown another modification of the splint clamping devices. In this construction the clamping jaws are not connected with the magazines, but are mounted beneath the same. The jaws, noted 7ª, are in the nature of parallel bars, extending beneath the several rows of magazines. The adjacent edges of the bars, immediately beneath the respective tubes, are provided with opposed recesses $8^a$ which are adapted to register when each pair of bars is moved together, and thereby constitute clamping jaws. Hence, when the splints enter the open jaws, if the latter be closed the splints will be clamped by and between them. A means by which these jaws may be operated comprises a transverse bar $9^a$ at each end of the machine provided with Λ-shaped ways $9^b$ therein through which project pins $8^b$ from the ends of the adjacent bars. The bar $9^a$ is connected with the vertically movable rods 10 on the lateral supporting posts 3, and is controlled by a cam similarly to the plate 9 of the clamping devices first described.

In Fig. 12 I have shown a modification of the bed upon which the splint-holding plate is supported. In this construction the upper surface of the bed is provided with an open chamber $a$ with which communicates a flexible tube $b$ which is connected with a fan or other air exhausting device. The top of this chamber is covered with wire gauze $c$ or other reticulated material. When the bed is in the position below the clamping jaws illustrated in the figure, that is, with the lower ends of the splints loosely resting upon the plate, if the air be exhausted from the chamber, the ends of the splints will be forcibly drawn into the perforations of the plate. The bed is then dropped, the air exhaust checked and the plate with its complement of splints removed from the machine.

I claim—

1. The combination of a splint holder or magazine, a normally-open clamping device at one end thereof, means for operating said device at predetermined intervals, a cam, and connections between the same and said clamp-operating device, substantially as described.

2. The combination of a series of parallel vertically-disposed splint magazines, normally-open clamping devices therefor, means for periodically operating said devices simultaneously, a cam, and connections between the same and said clamp-operating means, substantially as described.

3. The combination of a tubular splint magazine, normally-open clamping jaws at one end thereof, and a perforated plate through which said jaws extend and by which they are forcibly closed, substantially as described.

4. The combination of a tubular splint magazine, clamping jaws fast to the lower end thereof, a reciprocative perforated plate through which said jaws extend, and means for operating said plate, substantially as described.

5. The combination of a series of parallel vertically disposed splint magazines, normally open clamping devices at one end thereof, means for operating said devices simultaneously, a reciprocative bed beneath said clamping devices, and means for operating said bed in time with each operation of the clamping devices, substantially as described.

6. The combination of a series of parallel vertically disposed splint magazines, clamping devices on the lower end thereof, a perforated plate into which extend the upper ends of said tubes, and means for operating said clamping devices, whereby the lowermost splints in the magazines will be clamped at their lower ends and be freed at predetermined intervals substantially as described.

7. The combination of a series of parallel vertically disposed splint magazines, normally-open clamping devices on the lower end thereof, a perforated plate into which extend the upper ends of said tubes, and means for operating said clamping devices, to clamp and release successively the lowermost splints in the magazines, together with a movable or reciprocative hopper on said plate, substantially as described.

8. The combination of a tubular splint magazine, clamping jaws, a reciprocative clamp operating plate therefor, rods depending from said plate, and a positively-driven cam with which said plate is connected, substantially as described.

9. The combination of a series of parallel vertically disposed splint magazines, clamping jaws therefor, a reciprocative operating plate connected with said jaws, supporting plates for said magazines, hollow posts sustaining said latter plates, vertically reciprocative rods in said posts connected with the reciprocative plate and means for operating said rods, substantially as described.

10. The combination of a series of parallel splint magazines, normally open clamping jaws therefor, a perforated plate through which said jaws extend, and means for reciprocating said plate to compress the clamping jaws simultaneously, substantially as described.

11. The combination of a series of parallel splint magazines, normally open clamping jaws therefor, a perforated plate through which said jaws extend, means for reciprocating said plate, a supporting bed and means for moving said bed toward and from the clamping jaws at predetermined intervals, substantially as described.

12. The combination of a series of parallel vertically arranged splint magazines, clamping devices therefor, means for operating said devices, a reciprocative bed beneath said clamping devices, means for operating said bed, and means for delivering unfilled splint holding plates onto said bed, at predetermined intervals, substantially as described.

13. The combination of a series of parallel vertically arranged splint magazines, clamping devices therefor, means for operating said devices, a reciprocative bed beneath said clamping devices, means for operating said bed, means for delivering unfilled splint-holding plates onto said bed, and means for discharging said plates, when filled, substantially as described.

14. The combination with a splint-holding tube or magazine, and a co-acting clamping device of a reciprocative bed, a support adjacent thereto for splint-holding plates, said plates being milled or toothed as described, a wheel adapted to co-act with the milled or toothed portion of the plate resting on the support, and to impel said plate onto the reciprocative bed, a second wheel arranged to engage said plate on the bed, a driving gear intermediate said plate actuating wheels, and means for operating said driving gear at predetermined intervals, substantially as described.

15. The combination with a splint-holding tube or magazine, and a co-acting clamping device of a reciprocative bed, a support adjacent thereto for splint holding plates, mechanism adapted to transfer said plates successively to the bed, a positively driven shaft conditionally connected with said mechanism, and means whereby said mechanism is engaged with, and disengaged from, said shaft upon the reciprocation of the bed, substantially as described.

16. The combination with a splint-holding tube or magazine, and a co-acting clamping device of a bed, a support adjacent thereto for splint-holding plates, said plates being milled or toothed as described, a wheel adapted to co-act with the milled or toothed portion of the plate resting on the support, and to impel said plate onto the bed, a second wheel arranged to engage said plate on the bed, a driving gear intermediate said plate adjusting wheels, a positively-driven shaft extending through said intermediate gear, a sleeve on said shaft provided with a clutch member, and a co-acting clutch member on the shaft, substantially as described.

17. The combination with a splint-holding tube or magazine, and a co-acting clamping device of a bed, a support adjacent thereto for splint-holding plates, said plates being milled or toothed as described, a wheel adapted to co-act with the milled or toothed portion of the plate resting on the support, and to impel said plate onto the bed, a second wheel arranged to engage said plate on the bed, a driving gear intermediate said plate adjusting wheels, a positively-driven shaft extending through said intermediate gear, a sleeve on said shaft provided with a clutch member, and a co-acting clutch member on the shaft, together with means for preventing backward movement of said wheels, substantially as described.

18. The combination of a series of parallel vertically-disposed tubes, co-acting clamping devices, a vertically-reciprocative bed below the same, a positively-driven shaft, cams thereon and connections between said cams and the clamping devices and bed respectively, whereby said devices and bed are relatively actuated at prescribed periods, substantially as described.

19. The combination of a series of parallel vertically-disposed tubes, co-acting clamping devices, a vertically-reciprocative bed below the same, a positively-driven shaft, cams thereon and connections between said cams and the clamping devices and bed respectively, whereby said devices and bed are relatively actuated at prescribed periods, together with automatic mechanism for delivering splint-holding plates to, and discharging them from, said bed, substantially as described.

20. The combination with a series of vertically arranged splint-holding tubes or magazines, co-acting clamping devices, a vertically-reciprocative bed below the same, and means whereby said devices and bed are relatively actuated at prescribed periods, of a frame adjacent to said bed adapted to contain a vertically-arranged pile of perforated splint-holding plates, means for automatically ejecting each succeeding bottom plate of the pile and transferring the same onto the said bed when the latter is depressed, and means whereby the said plate, when it is supplied with splints, is automatically discharged from said bed, substantially as described.

21. A splint receptacle or hopper, comprising a horizontal chamber open on its under side, and a chamber curved upwardly from one end of said horizontal chamber whereby splints deposited horizontally in said upwardly curved chamber will be delivered vertically to said horizontal chamber and be discharged vertically through the open under side thereof, together with means for receiving the splints while maintaining them in a vertical position substantially as described.

22. A splint receptacle or hopper, comprising a horizontal chamber open on its under side and provided with two end chambers curving upwardly therefrom whereby splints deposited horizontally in said upwardly curved chambers will be delivered vertically to said horizontal chamber and be discharged vertically through the open under side thereof, together with means for receiving the splints while maintaining them in a vertical position substantially as described.

23. The combination with a series of vertically-arranged tubes, and a perforated supporting plate into which the upper ends of said tubes extend, of a splint-containing hopper on said plate comprising a horizontal chamber open on its under side and a chamber curved upward from the end of said former chamber, substantially as described.

24. The combination with a series of vertically-arranged tubes, and a perforated supported plate into which the upper ends of said tubes extend, of a splint-containing hopper on said plate comprising a horizontal chamber open on its under side and a chamber curved upward from the end of said former chamber, together with means for bodily agitating said hopper, substantially as described.

25. The combination of a series of vertically-arranged tubes, clamping jaws therefor, a vertically reciprocative bed beneath said jaws, a primary shaft, operative connections between the same and said jaws and bed, a vertical shaft geared with said primary shaft, a hopper arranged above said tubes, and operative connections between said hopper and primary shaft, substantially as described.

In testimony whereof I have hereunto affixed my signature in the presence of two subscribing witnesses.

JOSEPH C. DONNELLY.

Witnesses:
JOHN R. NOLAN,
JESSE B. HELLER.